United States Patent Office 2,826,599
Patented Mar. 11, 1958

2,826,599

RECOVERY OF METHYL ALKOXYSILANES FROM METHYLPOLYSILOXANES

Robert N. Meals, Ballston Lake, N. Y., assignor to General Electric Company, a corporation of New York No Drawing. Application September 26, 1955
Serial No. 536,751

1 Claim. (Cl. 260—448.8)

This invention is concerned with a method for recovering methyl alkoxysilanes from polymeric methylpolysiloxanes. More particularly, the invention relates to a process for obtaining methyl alkoxysilanes from methylpolysiloxanes having a general formula I.
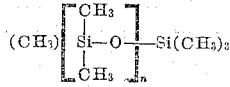

where $n$ is an integer equal to from 1 to 10, which process comprises (1) forming a mixture of ingredients composed of a methylpolysiloxane, a saturated monohydric aliphatic alcohol, and a catalytic amount of an alkali-metal hydroxide, the amount of alcohol being in excess of 1 mol of the alkanol per silicon atom in the methylpolysiloxane, (2) heating the mixture of ingredients under substantially anhydrous conditions at a temperature and under such conditions that azeotropic distillation occurs whereby there is obtained an azeotrope of the methyl alkoxysilane and the alkanol.

Methylpolysiloxanes of the above Formula I comprise volatile materials which are usually removed from methylpolysiloxane oils of higher molecular weight described in Patnode Patents 2,469,888 and 2,469,890. Usually, the amount of volatile materials corresponding to the methylpolysiloxanes described above is rather large, and although certain small amounts can be used in the reformulation of other organopolysiloxane oils, rubbers and resins, nevertheless, there is not a sufficiently wide use for these low molecular weight volatile linear methylpolysiloxanes of the above formula. Usually it is necessary to employ an expensive and time consuming procedure to degrade these low molecular weight methylpolysiloxanes to usable monomeric silanes.

I have now discovered that I am able to readily obtain monomeric methyl alkoxysilanes from the above-described low molecular weight, linear methylpolysiloxanes by azeotropically distilling the aforesaid methylpolysiloxanes, in the presence of catalytic amounts of an alkali-metal hydroxide, employing amounts of alkanols in certain excesses so that the number of mols of the alkanol is in excess of the number of silicon atoms in the methylpolysiloxane. The azeotrope thus obtained can then be treated to obtain the pure methyl alkoxysilanes by azeotroping the alkanol from the azeotrope with various substances which themselves form azeotropes with the alkanol, as for instance, propyl chloride, n-hexane, etc. The methyl alkoxysilanes in which the alkyl group of the alkoxy radical is the same as the alkanol used in the azeotropic distillation, can then be employed, either by themselves, or in combination with other cohydrolyzable organosilanes to make other organo-polysiloxane resins, rubbers, and oils, useful in various applications well known in the art. Thus, the trimethyl methoxysilane thus obtained may be employed to make high temperature pressure-sensitive organopolysiloxane adhesives more particularly described and claimed in the copending application of John T. Goodwin, Serial No. 442,181, filed July 8, 1954, and assigned to the same assignee as the present invention.

Among the alcohols which may be employed in the practice of the present invention are, for instance, methanol and ethanol. Preferably, only one alcohol should be used in order to avoid obtaining different azeotropes due to the presence of different alkoxy groups on the methylsilanes. It is preferred to use methanol.

The amount of alcohol used, on a molar basis, should be well in excess of one mol of the alkanol per gram atom silicon in the methylpolysiloxane. Part of the alkanol is for forming the alkoxy derivatives, while additional amounts of the alkanol are required to be available for azeotropic purposes. Consideration should be given to whether the trimethyl alkoxysilane and the dimethyl dialkoxysilane or both are to be formed from the alkanol when calculating the amount of alkanol to use. Thus, it is desirable that one employ from about 3 to 20 mols of the alkanol per gram atom silicon in the methylpolysiloxane. The actual amount of alkanol used will depend upon such factors as the length of the methylpolysiloxane (molecular weight), the alkanol used (which in turn influences the type of azeotrope obtained), rate of azeotropic distillation, etc. The optimum condition can be readily worked out by mere routine testing.

Among the alkali-metal hydroxides which may be employed are, for instance, sodium hydroxide, potassium hydroxide, cesium hydroxide, rhubidium hydroxide, etc. For optimum control and efficiency, potassium hydroxide is preferred. The amount of alkali-metal hydroxide used is generally in a catalytic amount and may range from about 0.01 to 2%, by weight, based on the weight of the methylpolysiloxane.

The manner whereby the present invention may be practiced is relatively simple. It is merely only necessary to form a mixture of the methylpolysiloxane, the alkanol, and the catalytic amount of alkali-metal hydroxide, and thereafter gently heat the mixture in a distilling column, for instance, at a temperature of from about 40 to 100° C. so as to obtain azeotropic distillation of the reaction product which will comprise the alkanol and the methyl alkoxysilanes. Usually, it will be found that under such conditions, the azeotrope of the alcohol and the trimethyl alkoxysilane will come off first and will be followed by the azeotropic mixture of the alkanol and the dimethyl dialkoxysilane. The use of anhydrous conditions throughout the reaction is essential if satisfactory reaction and optimum yield of product are to be obtained.

In order that those skilled in the art may better understand how the present invention may be practiced, the following examples are given by way of illustration and not by way of limitation. All parts are by weight.

*Example 1*

A mixture of 51.5 grams (0.166 mol) of decamethyltetrasiloxane, 73.2 grams (2.3 mols) methanol and 1.0 gram of potassium hydroxide was heated under anhydrous conditions under a distilling column filled with 2 feet of Stedman packing (Fenske type packing is also suitable) and topped by an intermittent take-off, total condensation distilling head. At about 5% take-off, a product came over boiling at 50–50.2° C., having a refractive index $n_D^{27}$ 1.3600, and a density $d^{26}$ 0.765. This azeotropic mixture was identified as being an azeotrope containing 15% methanol and 85% trimethyl methoxysilane. The presence of the trimethyl methoxysilane was further established by hydrolyzing this azeotrope in the presence of a small amount of hydrochloric acid to yield hexamethyldisiloxane, having a density $d^{26}$ 0.764 and a refractive index $n_D^{26}$ 1.3752 in 80% of the yield expected on this basis. When an amount of this azeotrope corresponding approximately to the amount of trimethylsiloxy groups in the charge had been removed, the boiling point of the distillate, at 1–2% take-off, rose to 62.6–63° C. At this point an azeotrope of methanol and dimethyldimethoxysilane was distilled off. Each of the azeotropes could be treated to free them of the methanol by further azeotropic distillation with, for instance, propyl chloride.

*Example 2*

Hexamethyldisiloxane may be treated in the same manner as described in Example 1 employing the same ingredients and conditions therein to yield trimethyl methoxysilane.

The methyl alkoxysilanes obtained in the practice of the present invention, in addition to being useful in making silicone rubbers, resins, oils, etc., are also useful per se for water-repellent treatments. Thus, the methyl alkoxysilane can be applied to various surfaces and solid bodies and heated slightly to effect condensation and form siloxane linkages whereby a water-repellent surface is obtained.

It will, of course, be apparent to those skilled in the art that other methylpolysiloxanes and alkanols as well as other alkali-metal hydroxides may be employed in addition to those described in the foregoing examples. Conditions other than those recited in these examples may be used within the prescribed limits without departing from the scope of the invention.

What I claim as new and desire to secure by Letters Patent of the United States is:

The process for obtaining methyl methoxysilanes from decamethyltetrasiloxane, which process comprises (1) forming a mixture of ingredients comprising decamethyltetrasiloxane, a catalytic amount of potassium hydroxide, and from 3 to 20 mols of methanol per gram atom silicon in the decamethyltetrasiloxane, the methanol being the sole solvent in the reaction mixture and (2) heating the mixture of ingredients under anhydrous conditions at a temperature of from about 40° to 100° C. within which temperature azeotropic distillation occurs in the absence of any water to give an azeotropic mixture of methanol and a methyl methoxysilane.

References Cited in the file of this patent

UNITED STATES PATENTS

| | | |
|---|---|---|
| 2,381,139 | Sauer | Aug. 7, 1945 |
| 2,485,366 | Di Gorgio et al. | Oct. 18, 1949 |
| 2,658,908 | Nitzsche et al. | Nov. 10, 1953 |
| 2,746,982 | Hyde | May 22, 1956 |